United States Patent [19]

Kanai et al.

[11] 4,068,272

[45] Jan. 10, 1978

[54] HIGH SENSITIVITY MAGNETIC HEAD USING MAGNETO-RESISTIVE EFFECT ELEMENT

[75] Inventors: Kenji Kanai, Neyagawa; Nobuyuki Kaminaka, Moriguchi; Norimoto Nouchi, Katano; Noboru Nomura, Kyoto, all of Japan

[73] Assignee: Matsushita Electric Industrial Co., Ltd., Osaka, Japan

[21] Appl. No.: 632,761

[22] Filed: Nov. 17, 1975

[30] Foreign Application Priority Data

Nov. 19, 1974 Japan .................. 49-133975
Nov. 20, 1974 Japan .................. 49-134019
Nov. 20, 1974 Japan .................. 49-134103

[51] Int. Cl.$^2$ .................. G11B 5/12; G11B 5/30
[52] U.S. Cl. .................. 360/113
[58] Field of Search .................. 360/113; 340/174 EB; 324/46; 338/32

[56] References Cited

U.S. PATENT DOCUMENTS

| Re. 26,610 | 6/1969 | De Koster | 360/113 |
| B 371,787 | 1/1975 | Thompson | 360/113 |
| 3,493,694 | 2/1970 | Hunt | 360/113 |
| 3,731,007 | 5/1973 | Masuda et al. | 360/113 |
| 3,814,863 | 6/1974 | O'Day et al. | 360/113 |
| 3,887,945 | 6/1975 | Nepela et al. | 360/113 |

OTHER PUBLICATIONS

IBM Technical Disclosure Bulletin, Bajorek et al., vol. 17, No. 1, June 1974, pp. 342-344.
IBM Technical Disclosure Bulletin, Bate et al., vol. 17, No. 4, Sept. 1974, pp. 967-968.

*Primary Examiner*—Alfred H. Eddleman
*Attorney, Agent, or Firm*—Stevens, Davis, Miller & Mosher

[57] ABSTRACT

This invention provides a high sensitivity magnetic head using magneto-resistive effect elements consisting of ferromagnetic thin plates and allows construction of a high precision multi-track head by using thin film and photo-etching techniques. The magnetic head comprises a base, two flux converging cores forming a magnetic gap, a detecting portion provided between the two flux converging cores and extending at right angles to the end of the base, one end of the detecting portion being located in the neighborhood of the gap and having a smaller sectional area than the other portions, and detecting electrodes provided at the opposite ends of the detecting portion. At least one of the two cores is of a ferromagnetic material and integrally formed on the base.

8 Claims, 11 Drawing Figures

HIGH SENSITIVITY MAGNETIC HEAD USING MAGNETO-RESISTIVE EFFECT ELEMENT

BACKGROUND OF THE INVENTION

1. Field of the Invention

This invention relates to a magnetic head employing magneto-resistive effect elements capable of high sensitivity and which permits high density mounting of multi heads.

In the reproduction of signals magnetically recorded in the form of residual magnetization in a magnetic recording medium, the voltage reproduced by the usual magnetic head is very low when the width of the record trace on the recording medium (track width) is very small. Also, where the track width of the magnetic head is greatly reduced, for instance to about several microns, the usual magnetic head encounters many difficulties. Further, it has been difficult with the prior art techniques of manufacture of magnetic heads to arrange such unit magnetic heads into a multi-track arrangement with high precision.

In order to provide solutions to these problems the invention contemplates a high sensitivity magnetic head using magneto-resistive effect elements consisting of ferromagnetic thin plates and construction of a high precision multi-track head by using thin film and photo-etching techniques.

2. Description of the Prior Art

FIG. 1 shows the principal construction of the prior art magnetic heads utilizing the magneto-resistive effect, that is, the fact that the electric resistance of a ferromagnetic material is changed when a magnetic field is applied thereto. In the arrangement of FIG. 1A, a magneto-resistive element 2 consisting of a ferromagnetic thin plate is held in contact with or near a recording medium 1 at right angles thereto (i.e., in the $y$ direction), and electrodes 3 and 4 are provided at the opposite ends of the magneto-resistive element 2 in the longitudinal direction thereof (i.e., in the $z$ direction). In this system, a constant current $i$ is caused to pass between the electrodes 3 and 4 and with a signal field from the recording medium 1 in the $y$ direction a corresponding change of resistance in the $z$ direction is detected from a change of voltage between the electrodes 3 and 4. With this system the intensity of the signal field from the recording medium 1 reduces exponentially with respect to the width of the magneto-resistive effect element 2 in the $y$ direction thereof, and particularly the attenuation of the signal field in the direction of width of the magneto-resistive effect element 2 is extremely large in the region of short wavelengths of the record on the recording medium.

A measure for avoiding such attenuation is to hold the magneto-resistive effect element 2 parallel to the recording medium as shown in FIG. 1B. Although this arrangement substantially eliminates loss in the $y$ direction, friction between the magneto-resistive effect element 2 which is usually a thin plate and the recording medium 1 poses difficulties in the practical use of this system.

In addition, in the above types of head it is structurally difficult to greatly reduce the dimension corresponding to the head track width, and the extreme reduction of the width of element 2 (in the $y$ direction) presents various problems in manufacture and also from the standpoint of the resistance against wear.

SUMMARY OF THE INVENTION

The invention seeks to solve the above problems. Basically, the invention features a construction in which a magneto-resistive effect element (where the magneto-resistive effect is utilized) is not held in contact with or near the recording medium but flux converging core portions are provided to lead the signal field to the magneto-resistive effect element, and a plurality of such portions are arranged on the same plane to construct a magnetic head having a very narrow track width.

DESCRIPTION OF THE PREFERRED EMBODIMENT

Figure 1A:
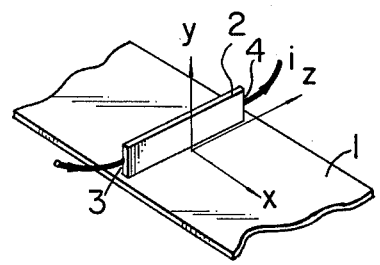
FIGS. 1A and 1B show basic structures of magneto-resistive effect magnetic heads of the prior art.
Figure 1B:
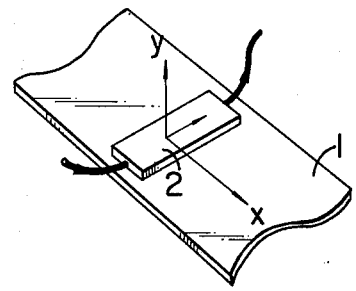
Figure 2:
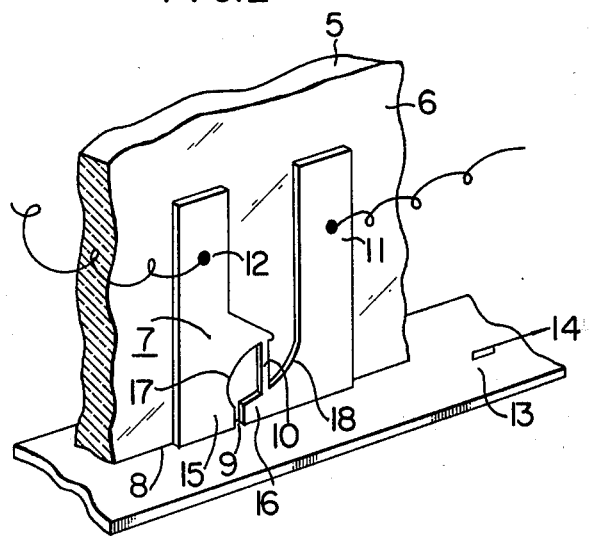
FIG. 2 is a fragmentary perspective view showing an embodiment of the magnetic head according to the invention.

FIG. 2 shows an embodiment of the invention. Referring to the Figure, designated at 5 is a base of a non-magnetic material such as silicon, glass and forsterite, and at 6 a non-conductive non-magnetic layer such as SiC, SiO, $SiO_2$, $Al_2O_3$, etc. provided on the base 5.

Designated at 7 is a thin film layer of a ferromagnetic conductive material such as permalloy provided in a predetermined form on the non-conductive non-magnetic layer 6 by means of evaporation deposition, electrodeposition or photo-etching, etc.

The thin film layer 7 constitutes a closed magnetic circuit having a magnetic gap portion 9 formed in the proximity of one end 8 of the base 5 and a magneto-resistive effect detecting portion 10 which is narrow or thin and has small sectional area and high electric resistance compared to the other portion.

Designated at 11 and 12 are detecting electrodes provided on opposite sides of the magneto-resistive effect detecting portion 10. Designated at 13 is a magnetic recording medium moved in contact with or in the proximity of the magnetic gap 9 in the direction of arrow 14. Signal flux produced from the magnetic recording medium 13 is detected at the magnetic gap 9 and led to the magneto-resistive effect detecting portion 10 through the flux converging core portions 15 and 16 on opposite sides of the magnetic gap 9.

To effectively lead the detected flux from the magnetic gap 9 to the detecting portion 10, one end of the detecting portion 10 is in contact with the flux converging core portion 16 in the neighborhood of the gap 9 while the other end portion extends substantially at right angles to the end 8 of the base. The flux converging core portion 15 magnetically coupled to the other end of the detecting portion 10 has an end face 17 of an arcuate or like curved profile facing the detecting portion 10 to thereby minimize the reluctance between the gap 9 and the end of the detecting portion 10 and also minimize leakage flux between the flux converging core portion 15 and detecting portion 10. The flux converging portion 16 also has an end face 18 of an arcuate profile facing the detecting portion 10 and terminating in a portion extending to the electrode 11.

With the above construction, the signal flux detected at the gap portion 9 is effectively led to the detecting portion 10, so that this magnetic head has high performance. Also, since the detecting portion 10 actually serving as the magneto-resistive element does not directly touch the recording medium, magnetic distortion noise or thermal noise due to frictional contact with the recording medium are eliminated to provide improved signal-to-noise ratio. Further, in the aspect of manufacture magnetic heads of small track width can be readily manufactured by such means as photo-etching techniques.

Furthermore, the arrangement of the detecting portion 10 whereby it extends in the normal direction with respect to the recording medium 13 as in the instant embodiment makes it possible to construct the detecting portion 10 of sufficient length without increasing the distance in the width direction of the head (i.e., the direction of travel of the recording medium). It also makes it convenient to apply a bias field to the detecting portion 10 as will be described hereinafter.

Regarding now the direction of magnetization of the ferromagnetic thin film layer 7, with the construction of FIG. 2 it is desirably taken in the direction of movement of the recording medium 13.

In this case, the direction of signal field at the detecting portion 10 is substantially normal to the magnetizing direction at the detecting portion so that high detection output can be obtained. At the same time, the direction of signal flux in the flux converging core 15 extending to the detecting portion 10 is substantially normal to the magnetizing direction, so that high magnetic permeability can be obtained to improve the efficiency of the head core.

Figure 3:
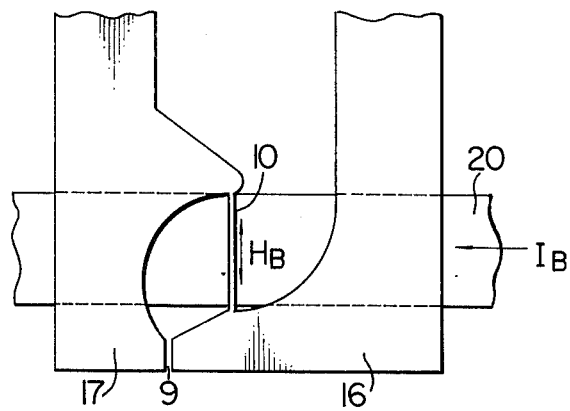
FIG. 3 is a fragmentary enlarged-scale plan view of a modification of the embodiment of FIG. 2.

FIG. 3 shows a modification of the magnetic head construction intended for providing an improved head sensitivity. Here, a strip-like conductor 20 is provided over the detecting portion 10 as in FIG. 2 via an insulating layer and extends at right angles to the detecting portion 10.

In this case, a bias field $H_B$ produced by supplying bias current $I_B$ through the conductor 20 is applied to the detecting portion 10.

Figure 4:
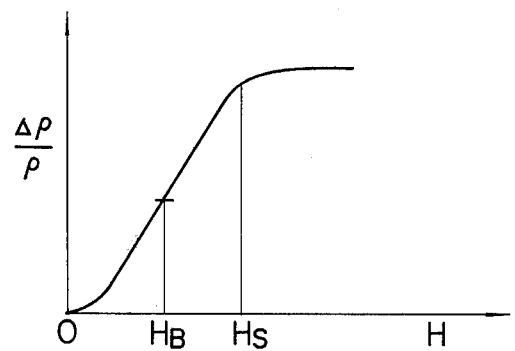
FIG. 4 is a graph showing a characteristic of the magnetic head.

The bias field $H_B$ is preferably one half the saturation field $H_S$ as shown in FIG. 4, which shows the relation between the rate $\Delta\rho/\rho$ of change of electric resistance of the detecting portion 10 and the applied field H.

Figure 5:
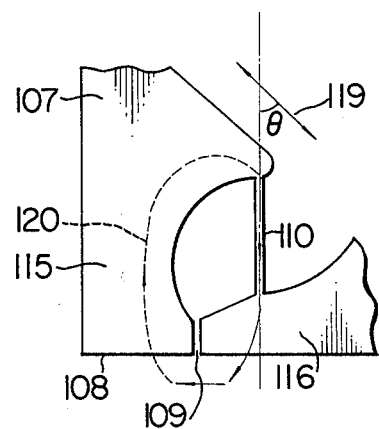
FIG. 5 is a fragmentary plan view illustrating a means for displacing the operation point of the magnetic head.

FIG. 5 shows a method of shifting the operating point over to a linear region. Here, the magneto-resistive effect detecting portion 110 has a rectangular form and extends in the direction of gap depth of the gap 109, while the magnetizing direction in the ferromagnetic thin film layer 107 is set to be substantially at angle = 45° with respect to the longitudinal direction of the detecting portion 110.

Figures 6, 7:
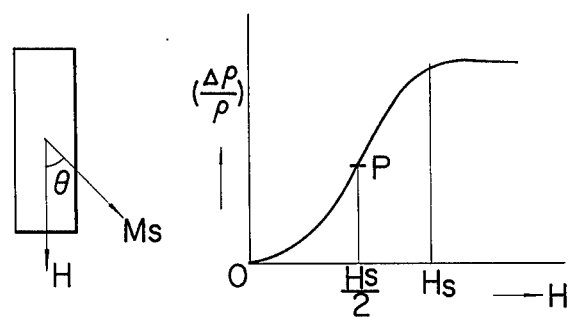
FIGS. 6 and 7 illustrate the operation of the head of FIG. 5.

FIG. 6 shows a close-up view of the detecting portion 110. Designated at $M_S$ is the direction of magnetization saturation of the magnetic thin film, and with the signal field H it is turned to the signal field. As a result, the electric resistance in the detecting portion 110 changes so that a read-out output is obtained from the detection current.

Since the angle of the magnetization direction tends to be less than about 45° due to the effect of the demagnetization-field even if it is set to 45° before the photo-etching, it is preferably greater than 45° so that it is off-set by the demagnetization-field to about 45°.

With this arrangement, in which the magnetization direction at the detecting portion 110 is inclined substantially 45° with respect to the longitudinal direction of the detecting portion 110, with signal flux appearing in the longitudinal direction of the detecting portion 110 the magnetization direction can be rotated about the portion 110 with the rotation magnetization. Thus, the operating point due to the signal field H can be set to mid point P between the saturation point $H_S$ and zero magnetization point as shown in FIG. 7, that is, a point which provides for the broadest dynamic range and is optimum from the standpoints of sensitivity and relation between the resistance change rate ($\Delta\rho/\rho$) and field.

Further, since the direction of the signal flux 120 from the residual magnetization $M_r$ in the recording medium shown in FIG. 5 is inclined with respect to the direction of the flux converging core portions 115 and 116, it is possible to obtain high permeability and improve the efficiency as the core head.

Now, other examples of the gap portion of different constructions will be given.

Figure 8:
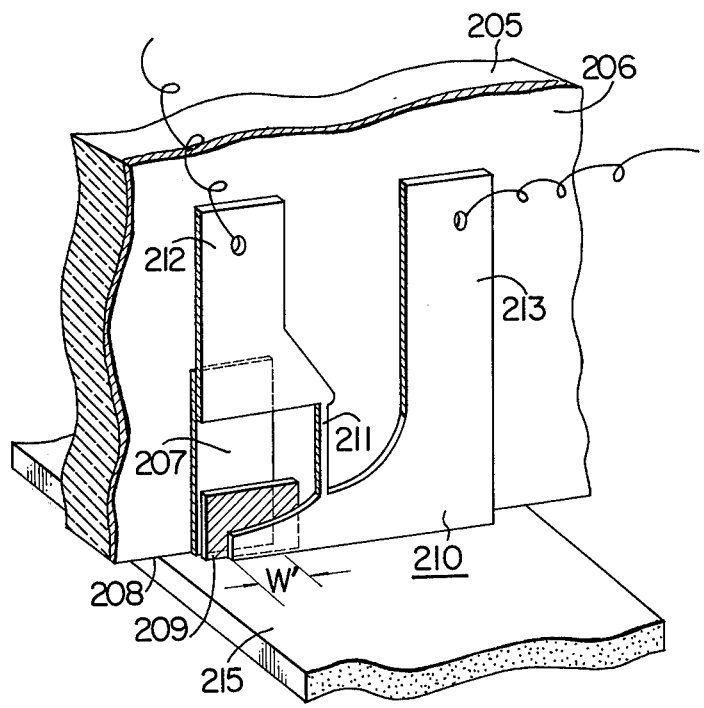
FIGS. 8 and 9 are fragmentary perspective views showing magnetic heads having different gap structures.

In FIG. 8, designated at 205 is a base of a non-magnetic material such as glass and silicon, on which a non-conductive non-magnetic film 206 such as SiO and SiO$_2$ is formed.

A first magnetic layer 207 is formed on the non-magnetic layer 206 such that its end is positioned adjacent to the end 208 of the base 206. A non-magnetic layer 209 constituting a magnetic gap is provided on the magnetic layer 207 adjacent to the end 208 of the base. Further, a second magnetic layer 210 of a ferromagnetic conductive material such as permalloy is formed by means of deposition on the non-magnetic layer 209.

The ferromagnetic layer 210, as shown in FIG. 8, has a portion facing the first magnetic material 207 via the non-magnetic material layer 209 and is formed to magnetically couple to the other end of the first magnetic layer 207 through a detecting portion 211 of a small sectional area compared to the other portion. In this way, a closed magnetic circuit is formed by the air gap constituted by the non-magnetic material layer 209, first magnetic material layer 207 and second magnetic material layer 210 including the detecting portion 211.

Portions of the second magnetic material layer 210 extending from the opposite ends of the detecting portion 211 are respectively provided with detecting electrodes 212 and 213.

With the above construction, by moving the magnetic recording medium 215 in contact with or in the proximity of the end 208 of the base 205 the signal flux from the recording medium 215 is detected at the magnetic gap and is effectively led by the closed magnetic circuit to the detecting portion 211.

In this case, the width W' of the over-lapping portions of the first and second magnetic material layers 207 and 210 facing each other via the non-magnetic material layer 209 constitutes the track width of the magnetic head.

For effectively leading the signal flux from the magnetic gap to the detecting portion, it is desirable to space the detecting portion 211 as far as possible from the first and second magnetic material layers 207 and 210 and so prevent leakage flux. Also, for providing for improved efficiency of detection at the detecting portion 211 uniaxial magnetization is desired in forming the second magnetic material layer 210 by means of vacuum evaporation deposition or electro-deposition.

Figure 9:
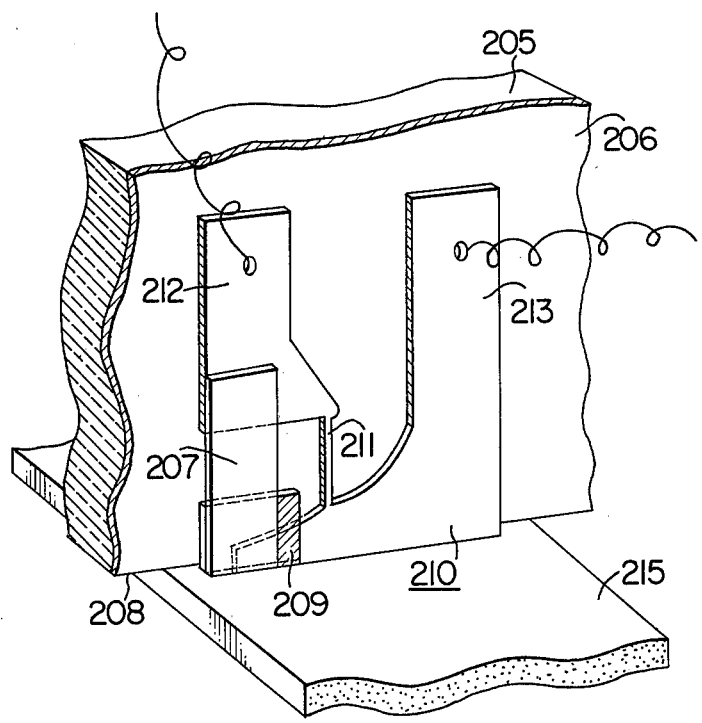

FIG. 9 shows a different example, in which the order of formation of the first and second magnetic material layers 207 and 210 on the base 205 is reversed to obtain the same effect as in the case of FIG. 8. From the standpoint of manufacture, the construction of FIG. 8, in which the detecting portion 211 is formed near at the end of the manufacturing process, is preferred.

Figure 10:
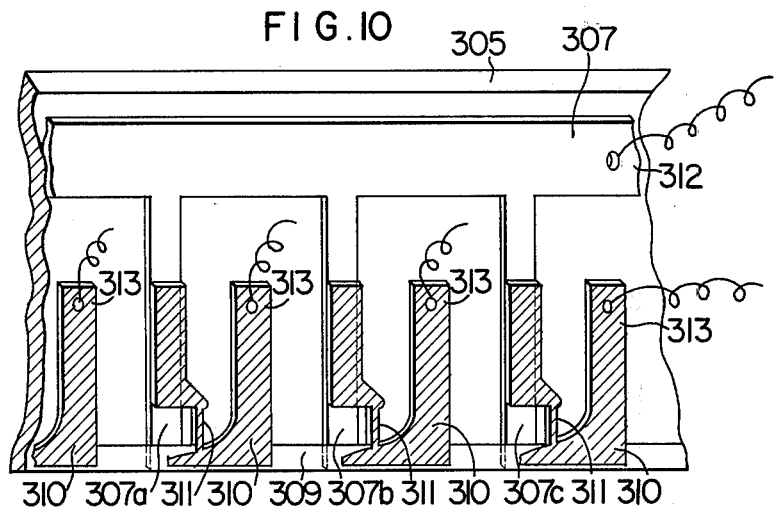
FIG. 10 is a fragmentary perspective representation of a multi-element magnetic head embodying the invention.

FIG. 10 shows an example of the so-called multi-channel head wherein a plurality of magnetic heads of the construction of FIG. 8 are formed on the same base. Here, a first magnetic material layer 307 is made of a conductive material and has a comb-like shape having a plurality of teeth electrically connected to one another. A non-magnetic material layer 309 is made common for the individual teeth 307a and 307b of the first magnetic material layer 307, which serves as the common electrode.

With this construction, a plurality of magnetic heads can be simultaneously formed on the base.

With the above construction, the density distribution of the flux in the magneto-resistive elements 311 (i.e., the detecting portion) in the sectional area thereof are made uniform, permitting 100 percent utilization of the performance of the magneto-resistive change rate $\Delta\rho/\rho$, so that it is possible to obtain broad dynamic range as of the magnetic head and improve the sensitivity. Structurally, the magneto-resistive effect element does not directly touch the recording medium and it is possible to eliminate magnetic distortion noise and thermal noise due to friction with the medium and greatly improve the signal-to-noise ratio. Also, with the photo-etching techniques a magneto-resistive effect element of a small width can be readily realized. Further, since the element is not arranged to be in direct frictional contact with the recording medium, the service life of even an element of a very small width is never relevant to wear. Furthermore, it is possible to realize a magnetic head of very small track width.

Moreover, a multi-channel arrangement of magneto-resistive effect heads of small track widths is readily possible. In addition, since electrical processing is done with the common terminal, it is possible to greatly simplify the construction and reduce the space between adjacent unit magnetic heads.

We claim:

1. A magnetic head comprising a base having a surface and an end face; first and second flux converging cores, at least one of said cores defining a magnetic gap; a detecting portion having a cross-sectional area smaller than that of either of said first and second flux converging cores connecting said cores and extending at right angles to the end face of said base, said detecting portion having one end located in the neighborhood of said magnetic gap and being in parallel magnetically with said gap; and detecting electrodes coupled to the opposite ends of said detecting portion, said detecting portion and at least one of said first and second cores being of a ferromagnetic conductive material and integrally formed on the surface of said base.

2. A magnetic head according to claim 1, wherein said gap is defined by two end faces of said ferromagnetic conductive flux converging cores and extends in a direction along said base end.

3. A magnetic head according to claim 1, wherein said gap is defined by two overlapping end portions of said ferromagnetic conductive flux converging cores and a non-magnetic material interposed between said overlapping end portions.

4. A magnetic head according to claim 1, wherein the magnetizing direction of said ferromagnetic conductive materials is substantially normal to the longitudinal direction of said detecting portion.

5. A magnetic head according to claim 1, which further comprises a conductor formed over said detecting portion, and an insulating layer interposed between said conductor and said detecting portion, said conductor extending substantially at right angles to said detecting portion and being adapted to carry a bias current.

6. A magnetic head according to claim 1, wherein at least one of said ferromagnetic conductive flux converging cores has an edge portion facing said detecting portion which is curved with respect to said detecting portion.

7. A magnetic head according to claim 1, wherein the direction of depth of said magnetic gap coincides with the longitudinal direction of said detecting portion, and also wherein the magnetizing direction of said ferromagnetic conductive materials is inclined with respect to the longitudinal direction of said detecting portion.

8. A magnetic head comprising a base, first and second ferromagnetic layers affixed to said base, at least one of said ferromagnetic layers exhibiting the magneto-resistive effect; a non-magnetic layer interposed between said first and second layers, said non-magnetic layer being located adjacent one end of said base to form a plurality of closed magnetic circuits each including a magnetic gap comprising said non-magnetic layers; each of said plurality of closed magnetic circuits further including a detecting portion formed of one of said first and second ferromagnetic layers exhibiting the magneto-resistive effect, said detecting portion having a sectional area smaller than the remainder of the ferromagnetic layer of which said detecting portion is a part; a common first detecting electrode electrically connected to one end of each of said detecting portions; and a plurality of second detecting electrodes each provided at the other end of each of said detecting portions respectively.

* * * * *